US007033658B2

(12) United States Patent
Ringness

(10) Patent No.: US 7,033,658 B2
(45) **Date of Patent: *Apr. 25, 2006**

(54) SIMULATED STONE BLOCK AND AGED ARTIST'S CANVAS ARTICLES AND METHOD

(76) Inventor: Gregory J. Ringness, 527 English, Irving, TX (US) 75061

(*) Notice: Subject to any disclaimer, the term of this patent is extended or adjusted under 35 U.S.C. 154(b) by 33 days.

This patent is subject to a terminal disclaimer.

(21) Appl. No.: 10/929,643

(22) Filed: Aug. 30, 2004

(65) Prior Publication Data

US 2005/0025908 A1 Feb. 3, 2005

Related U.S. Application Data

(62) Division of application No. 10/189,962, filed on Jul. 3, 2002, now Pat. No. 6,810,632.

(51) Int. Cl.

| | |
|---|---|
| ***A01N 1/00*** | (2006.01) |
| ***B44F 7/00*** | (2006.01) |
| ***B44F 9/00*** | (2006.01) |
| ***E04F 13/04*** | (2006.01) |
| ***E04B 9/00*** | (2006.01) |

(52) U.S. Cl. ........................ 428/45; 442/149; 442/255; 442/256; 52/314; 52/315; 52/343; 52/344; 52/311.1; 139/426 R; 428/15

(58) Field of Classification Search .................. 52/314, 52/315, 343, 311.1; 442/59, 62, 63, 64, 66, 442/69, 71, 73, 152, 154, 386, 149, 255, 442/256; 428/15, 27, 45; 139/426 R
See application file for complete search history.

(56) References Cited

U.S. PATENT DOCUMENTS

| | | | | |
|---|---|---|---|---|
| 153,781 | A | 8/1874 | Power | |
| 1,601,852 | A | 10/1926 | Clark | |
| 3,740,911 | A | 6/1973 | O'Leary | |
| 4,164,598 | A * | 8/1979 | Wilhelm | 428/48 |
| 4,292,775 | A | 10/1981 | Howard | |
| 4,432,150 | A * | 2/1984 | Swonger | 38/102.5 |
| 4,644,719 | A | 2/1987 | Salazar | |
| 4,668,451 | A | 5/1987 | Langson | |
| 4,781,002 | A | 11/1988 | Chichester | |
| 4,975,303 | A | 12/1990 | McKinnon | |
| 5,213,732 | A | 5/1993 | Jevtic | |
| 5,274,982 | A | 1/1994 | Price | |
| 5,534,610 | A | 7/1996 | Bayly et al. | |
| 5,536,769 | A * | 7/1996 | Sandor | 524/388 |
| 5,624,615 | A | 4/1997 | Sandorff | |
| 5,715,637 | A | 2/1998 | Hesterman et al. | |
| 5,900,180 | A | 5/1999 | Scott et al. | |
| 6,110,317 | A * | 8/2000 | Sandor | 156/235 |
| 6,237,294 | B1 * | 5/2001 | Rygiel | 52/314 |
| 6,810,632 | B1 * | 11/2004 | Ringness | 52/314 |

* cited by examiner

*Primary Examiner*—Terrel Morris
*Assistant Examiner*—Matthew D. Matzek
(74) *Attorney, Agent, or Firm*—Gardere Wynne Sewell LLP

(57) ABSTRACT

Articles comprising simulated stone block walls and artist's canvases may be formed by providing a burlap or canvas substrate, coating the substrate with a layer of gypsum wallboard finishing compound or similar plaster-like composition, and folding or otherwise manipulating the substrate when a predetermined set or hardening of the composition has occurred to create cracks, crevices and chipped corners of the article, for example, to simulate a broken stone block or an aged artist's work.

8 Claims, 2 Drawing Sheets

SIMULATED STONE BLOCK AND AGED ARTIST'S CANVAS ARTICLES AND METHOD

CROSS REFERENCE TO RELATED APPLICATION

This application is a division of application Ser. No. 10/189,962, filed Jul. 3, 2002, now U.S. Pat. No. 6,810,632 B2.

BACKGROUND

There are many instances where simulations of articles, such as stone blocks used for architectural purposes, are desirable. There are similar instances wherein the simulation of articles, such as aged artist's canvas, are also desirable. Both of the above-mentioned simulations are desirable for aesthetic purposes and, heretofore, have been difficult to produce. It is to overcome the inability to provide aesthetically pleasing simulated stone blocks for use as decorative wall coverings as well as exterior finishing of architectural works that the present invention has been developed. It is also to overcome the inability to properly simulate an aged artist's canvas, that is, a canvas showing cracks and aging, that the present invention has also been directed.

SUMMARY OF THE INVENTION

The present invention provides an article comprising a simulated stone block facing or veneer-like article suitable for use as a wall covering to simulate a stone block wall.

The present invention also provides a method for forming a wall covering article which simulates an aged stone block and the like.

The present invention further provides an article comprising an artist's canvas suitable for simulating an aged artwork. Still further, the invention provides a method for providing a simulated aged artist's canvas.

In accordance with important aspects of the present invention, simulated stone block wall covering articles and simulated artist's canvas articles are provided wherein a substrate comprising a fabric panel and the like is coated with a composition, such as gypsum wallboard plaster or joint compound, the plaster or joint compound is allowed to completely harden or to harden to a degree which will not result in any flow or sloughing off of the material from the substrate so that the substrate may be manipulated or folded temporarily to create cracks and crevices in the surface of the article to simulate an aged stone block or an aged artist's canvas, for example.

The present invention also provides a method for providing simulated stone block wall coverings or veneers formed by pre-shaped panels of a substrate of a flexible fabric which is coated with a hardenable thixotropic composition, such as gypsum wallboard plaster or joint compound, which composition is allowed to substantially "set" or dry followed by manipulating or folding the substrate to simulate cracks, crevices and chipped corners, for example.

In accordance with yet a further aspect of the invention, a method is provided for producing a simulated aged artist's canvas characterized by a flexible substrate to which the aforementioned composition is applied and allowed to set or harden to a degree which will allow the substrate to be temporarily folded to generate cracks or crevices on the face of the canvas to simulate an aged canvas.

Those skilled in the art will further appreciate the above-mentioned aspects of the invention together with other superior features upon reading the detailed description which follows in conjunction with the drawings.

DETAILED DESCRIPTION OF THE PREFERRED EMBODIMENTS

Figure 1:
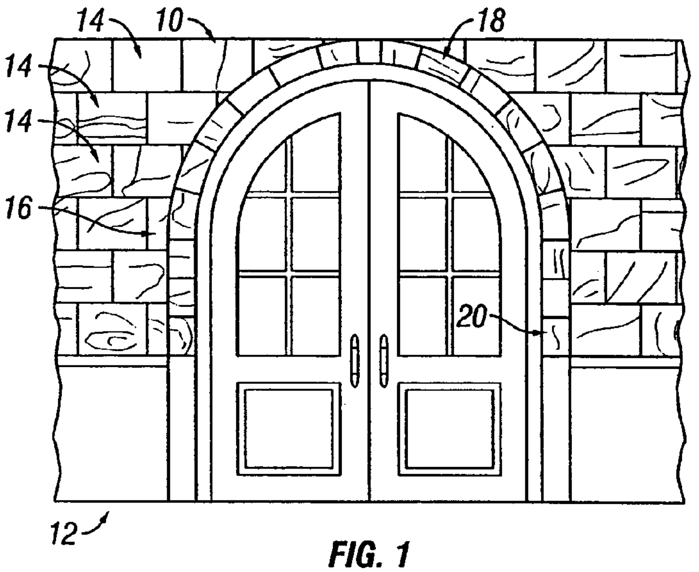
FIG. 1 is a view of a simulated stone block wall of a building provided by articles and a method in accordance with the present invention.

In the description which follows like elements are marked throughout the specification and drawings with the same reference numerals, respectively. The drawing figures are not necessarily to scale and certain features may be shown generally or in somewhat schematic form in the interest of clarity and conciseness.

Referring briefly to FIG. 1, there is illustrated a portion of an interior wall 10 of a building 12 which has been constructed to simulate stone blocks 14, 16 and 18, for example. The wall 10 may include a basic structure constructed of conventional interior wall structural elements, such as gypsum board panels. However, the structure of the wall 10 may be of other elements. In order to give the interior wall 10 an aesthetic quality or appearance of a stone block wall, plural, generally rectangular or trapezoidal shaped block elements or panel articles are prepared in accordance with a method of the invention and are arranged in the pattern shown in FIG. 1 to simulate a stone block wall including an arch portion 20. Panels 14, 16 and 18 are formed in accordance with the invention as will be described in further detail herein and are adhered to the aforementioned structural part of the wall 10 with conventional wallpaper adhesives. For example, an adhesive such as Sherwin Williams Surestick III brand adhesive may be used to adhere the panels or articles 14, 16 and 18 to the underlying, substantially flat surface of the wall structure to provide the simulated stone block wall appearance of the wall 10 illustrated.

Figure 2:
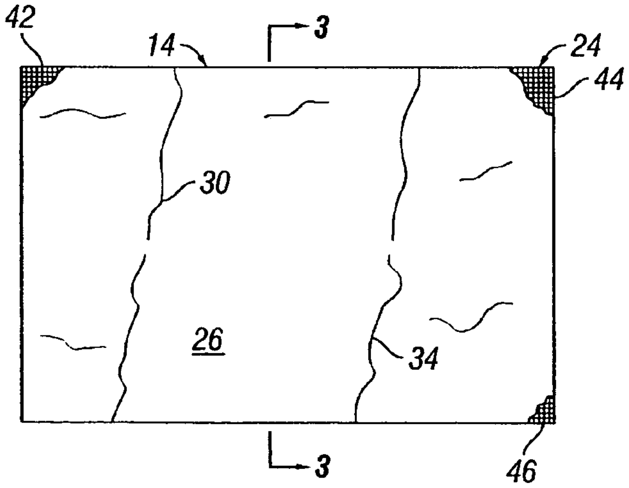
FIG. 2 is a plan view of a panel like article forming a simulated stone block in accordance with the invention.
Figure 3:
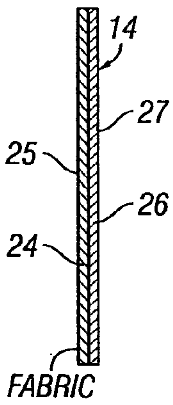
FIG. 3 is a section view taken along line 3—3 of FIG. 2.
Figure 3A:
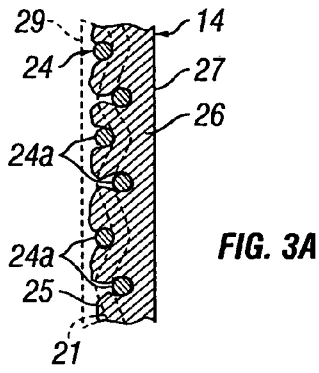
FIG. 3A is a detail section view taken from line 3—3 but on a larger scale.
Figure 4:
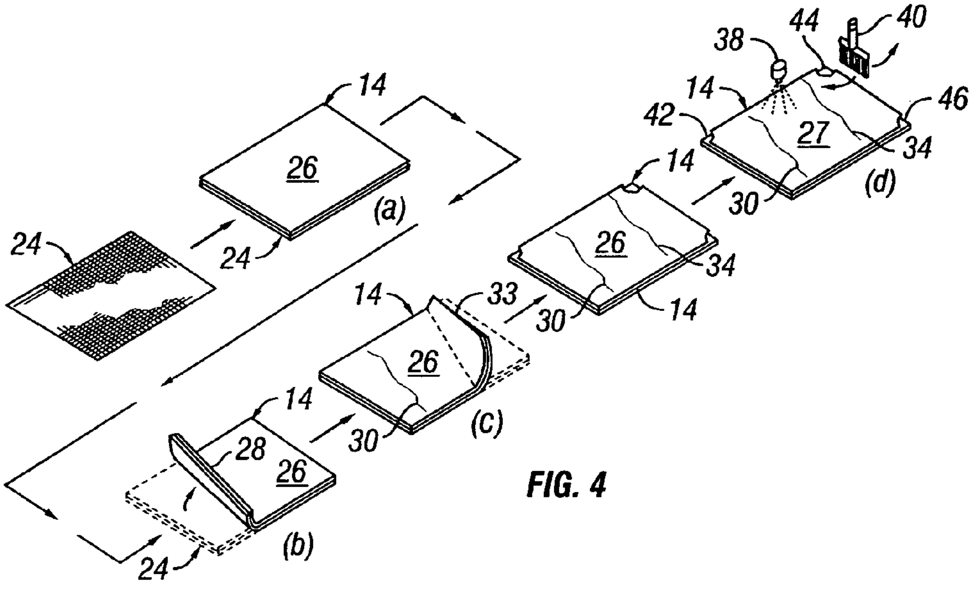
FIG. 4 is a schematic diagram showing certain steps in the production of simulated stone block panel articles in accordance with the invention.

The construction and fabrication of the simulated stone block wall panels 14, 16 and 18 will now be described in conjunction with FIGS. 3, 3A and 4. Referring to FIGS. 2 through 4, an article comprising a panel 14 is illustrated. The panel 14 is formed of a substrate 24 which is preferably conventional burlap having a weight range of about 7.0 ounces to 10.0 ounces, for example. The dimensions of a panel 14 may vary considerably as well as the geometry of a panel, as indicated by the panels 14, 16 and 18. However, for ease of handling panels preferably should not exceed, for rectangular panels, dimensions of about sixteen inches by ten inches, for example. Moreover, the substrate 24, while preferably formed of burlap using natural fibers, such as jute or hemp, may also be formed of a coarse woven fabric including synthetic or polymer-like materials.

A panel 14 may be formed by applying a plaster-like composition of the types described herein to the substrate 24 to form a compositional layer 26, step (a) in FIG. 4, having the appearance of a ceramic or stone-like material. A preferred composition for the material layer 26 is conventional gypsum wallboard premixed joint compound or premixed topping compound, for example, and typically known in the building trades as "mud". Such compositions are typically formed from mixtures of calcium carbonate, mica, talc, perlite, attapulgite clay, plaster of Paris, bentonite clay, polyvinyl alcohol and gypsum, for example. These compositions may be acquired commercially from entities such as National Gypsum Company or United States Gypsum Company, premixed and ready to apply by conventional methods including troweling or the like. Compositions for providing the layer 26, in order to facilitate ease of fabrication, are available which have so-called setting, drying or hardening times which vary from twenty minutes, for example, to several hours depending on ambient temperature and relative humidity. The faster drying compositions, namely those having drying or setting times of twenty minutes, thirty minutes or forty-five minutes are preferred for use in accordance with the invention. For forming simulated stonewall panels, such as the panels 14, 16 and 18, the thickness of the composition layer 26 should be in a range of about 0.063 inches to about 0.25 inches. FIG. 3A illustrates how the composition layer 26 is applied to penetrate spaces between woven threads 24*a* of substrate 24 to aid in firmly bonding the composition forming layer 26 to the substrate.

As shown in FIG. 4, one-technique for simulating cracking or aged stonewall panels may be carried out by manipulating the substrate 24 by, for example, creating a fold 28 in panel 14, as illustrated in step (b) in FIG. 4, just prior to a complete drying or hardening of the composition layer 26. For example, if using one of the aforementioned compositions which has a total hardening time of twenty minutes, at an interval of about fifteen minutes from application of the layer 26 to the substrate 24 the panel 14 may be folded by lifting one side of the panel, as indicated in FIG. 4, to form the fold 28 and then returning the panel to a planar position. This action will form a crack or crevice 30, as shown in FIGS. 2 and 4, in the planar panel 14.

Upon forming a first crack or crevice 30 the panel 14 may be quickly folded at another fold in any one direction, as indicated at 33, in FIG. 4, step (c), to form a second crack or crevice 34. The panel 14 is, after making fold 33, returned to a planar position, as shown. Thus, the composition layer 26 is firm enough at about seventy-five percent to one hundred percent of the full hardening or setting time to form a permanent crack without the risk of more substantial change to the composition layer.

The article or panel 14 may then receive further treatment, such as the application of a finish as indicated in step (d) in FIG. 4. Such finish may be applied by one or more spray nozzle means 38 or by one or more brushes or rollers, as indicated at 40 in FIG. 4, step (d). Finishes which may be applied to surface 27 of panel 14, if used as a simulated stonewall block or panel, include latex or oil based compositions. If the panels 14, 16 and 18 are to be applied to an interior wall, the surface 27 of the layer 26 may have suitable latex or oil based primers applied thereto followed by application of oil based or latex based stains, glazes or lacquer compositions. In other words, conventional clear or pigmented finishes may be applied to the surface 27 of the layer 26 to provide the coloring and protection desired. For example, for an interior wall panel, a latex primer may be applied directly to the raw surface 27 as a first coating thereon. Sherwin Williams Prep Rite 400 brand latex primer may be used, for example. As a second coating layer, Sherwin Williams Eg-Shel, Promar 200 brand hard drying enamel may be applied over the primer although a flat enamel may be used in place of the above-mentioned composition. In order to highlight the cracks in the layer 26, a third coating may be applied over the above-mentioned enamel, such as a Duroseal brand combination stain and sealer. Still further, an oil based glazing composition may be applied as a final coat over the above-mentioned combination stain and sealer. Other combinations of finishes may be applied.

The folding of the panel 14 to form cracking may not be desired. In other words, following the application of the composition layer 26 to the substrate 24, such layer may be allowed to harden completely followed by careful manipulation of the panel 14 to apply an adhesive layer 29 to the substantially uncoated surface 25 of the substrate 24, FIGS. 3 and 3A, and then applying the panel to the surface of the wall 10. However, during normal handling of a panel, such as the panels 14, 16 and 18, minor cracks may occur and one or more corners of layer 26 may break away, as indicated in FIG. 2, and at step (d) in FIG. 4, such broken corners being designated by the numerals 42, 44 and 46. Accordingly, although the composition layer 26 is possibly broken away in small breaks at corners 42, 44 and 46 and cracks may develop during handling of the panel 14 such irregularities will enhance a desired appearance of the panels 14, 16 and 18, for example.

In order to produce a superior visual effect with a wall, such as the wall 10, the substrate 24 may be pre-colored a dark or at least contrasting color with respect to the color of the surface 27 of the layer 26 in its final form. Alternatively, the spaces between adjacent panels and the spaces created by the broken corners 42, 44 and 46, for example, may be painted a contrasting color after the panels are mounted on the wall 10. After the panels have been applied to a wall structure and the adhesive allowed to set, a simulated mortar joint may also be provided by using mortar repair compositions applied to the spaces between the adjacent panels. Quikrete brand mortar repair or Sikaflex brand polyurethane sealant may be applied to the surface of the wall 10 between adjacent panels to simulate mortar between the panels. The above-mentioned mortar repair or sealant compositions may be of selected colors. Various other techniques may also be carried out for forming a contrasting color of the cracks or spaces between panels or cracks formed in particular panels.

Although the finished size of a simulated stone block panel may be as described above, multiple panels may be formed in accordance with the method of the invention as shown in FIG. 4, and after completion of at least step (c) in FIG. 4, a panel 14 may be cut to form two or more panels, for example. In this way, the continuity of a large crack in a wall may be simulated since the individual simulated stone block panels which are cut from a single large panel, after forming the cracks therein, will show the same crack, after the panels are applied to the wall, extending between adjacent panels.

Figure 5:
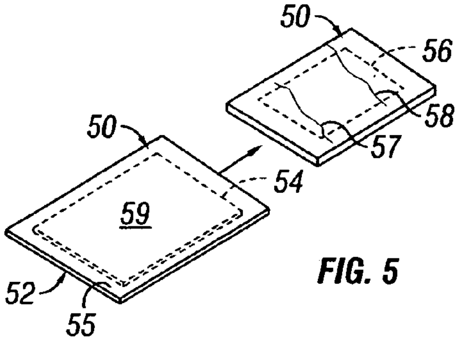
FIG. 5 is a schematic diagram showing certain steps in the fabrication of an aged artist's canvas article in accordance with the invention.

The present invention also contemplates providing an article comprising an artist's canvas for use by artists to produce simulated older or aged visual artworks. As shown in FIG. 5, an article comprising an aged artist's canvas 50 may be provided using a generally rectangular substrate 52 formed, for example, of conventional unprimed cotton or linen canvas of a medium weight, that is about seven ounce to twelve ounce loom state canvas. A relatively thin layer of one of the aforementioned "mud" compositions may be applied to the substrate 52 as indicated at 54 in FIG. 5. The thickness of composition layer 54 is also preferably about 0.063 inches to 0.25 inches. The entire surface of the substrate 52 may be covered or a relatively narrow perimeter or border area 55, FIG. 5, may be left uncovered so that this border can be folded over a frame 56 and secured to the sides or back thereof in a conventional manner prior to applying paint to the working surface 59 of the artist's canvas 50.

In the formation of an artist's canvas in accordance with the invention, the panel or "canvas" 50 may be pre-cracked in a desired manner as is accomplished for the simulated stone block panels 14, 16 and 18, by carrying out steps (a), (b) and (c) of FIG. 4 to provide a cracked surface of the layer 54. Additional cracking may occur when the canvas panel 50 is secured to the frame 56 around the perimeter thereof in a conventional manner.

By way of example, the article 50 may, upon final hardening or curing of the compositional layer 54, be primed with acrylic, oil or alkyd primer paints, for example, followed by the application of a so-called eggshell, latex or satin semi-gloss enamel and, if desired, oil or latex based stains to further highlight cracks or crevices, such as cracks and crevices 57 and 58, viewing FIG. 5. A series of finish compositions as described hereinabove for a simulated stone block panel may also be applied to the aged artist's canvas article. However, the final coating should be in contrast to the composition of the paint to be used by the artist. For example, if the artist will be using oil based paints, then the outer layer of finish composition on the surface of the artist's canvas should be a latex composition and vice versa.

Those skilled in the art will recognize that a so-called "pattern" of cracks, crevices or chipped places in the articles 14 and 50 may vary essentially infinitely depending on how the flexible substrates 24 and 52 are folded or manipulated at the proper time during the setting or "curing" of the composition layers 26 and 54. As previously discussed, the further handling of these prepared articles may result in additional cracking or the breaking off of chips and corner pieces during normal handling thereof prior to application to a wall 10 or to a frame, such as the frame 56, for the artist's canvas article 50. However, the weave of the substrates for all embodiments of the invention is such that at least some of the spaces between the threads of the weave are filled by the composition of the layers 26 and 52 as indicated in FIG. 3A, in forming a tight bond between the composition layers and the substrates.

Those skilled in the art will further recognize that possibly other fabric materials may be used for the substrates 24 and 52 although the materials described herein are preferred. Lastly, the compositional nature of the layers 26 and 54 may also be selected from other so-called "plaster" materials, although the materials specified herein are preferred.

Still further, those skilled in the art will recognize that various other substitutions and modifications may be made to the invention embodied in the articles and methods described herein without departing from the scope and spirit of the appended claims.

What is claimed is:

1. An artist's canvas formed of a flexible substrate having opposed sides and selected from a group consisting of burlap, cotton canvas, linen canvas and a woven fabric, coated with a layer of one of gypsum wallboard finish composition and joint covering composition at a thickness in a range of about 0.063 inches to 0.25 inches to form a finish receiving surface;

said substrate being secured to a perimeter frame and including one or more aging cracks and crevices in said coated layer formed by physical manipulation of said substrate when said layer has hardened to a range of 75% to 100% of complete hardness of said composition; and a finish on said receiving surface including a primer coating of one of acrylic, oil or alkyd primer paint underlying a coating of one of eggshell, latex, and satin semi-gloss enamel and an overlying layer of one of oil and latex stain visually highlighting said cracks and crevices.

2. The artist's canvas set forth in claim 1 wherein:

at least one side of said substrate is covered in its entirety with said layer of said composition.

3. The artist's canvas set forth in claim 1 wherein:

said layer extends over at least one side of said substrate to an edge of said composition which is spaced from a perimeter edge of said substrate to provide a narrow border area at said perimeter edge of said substrate which is devoid of said composition.

4. The artist's canvas set forth in claim 1 wherein:

said substrate comprises one of unprimed cotton and linen canvas of a weight of from about seven ounces to twelve ounces loomstate canvas.

5. An artist's canvas formed of a flexible substrate having opposed sides and selected from a group consisting of burlap, cotton canvas, linen canvas and a woven fabric, coated with a layer of one of gypsum wallboard finish composition and joint covering composition at a thickness in a range of about 0.063 inches to 0.25 inches to form a finish receiving surface;

said substrate being secured to a perimeter frame and including one or more aging cracks and crevices in said coated layer formed by physical manipulation of said substrate when said layer has hardened to a range of 75% to 100% of complete hardness of said composition; and a finish on said receiving surface including a primer coating selected from a group consisting of acrylic primer, alkyd primer, latex primer, and oil based primer, a coating over said primer coating of one of eggshell, latex and satin semi-gloss enamel and an overlying coating highlighting said cracks and crevices.

6. The artist's canvas set forth in claim 5 wherein:

said at least one side of said substrate is covered in its entirety with said layer of said composition.

7. The artist's canvas set forth in claim 5 wherein:

said composition extends over at least one side of said substrate to an edge of said composition which is spaced from a perimeter edge of said substrate to provide a narrow border area at said perimeter edge of said substrate which is devoid of said composition.

8. The artist's canvas set forth in claim 5 wherein:

said overlying coating comprises one of oil and latex stain highlighting said cracks and crevices.

* * * * *